(12) United States Patent
Shin et al.

(10) Patent No.: US 11,063,318 B2
(45) Date of Patent: Jul. 13, 2021

(54) CYLINDRICAL BATTERY CELL HAVING NO BEADING PART

(71) Applicant: LG Chem, Ltd., Seoul (KR)

(72) Inventors: Hang Soo Shin, Daejeon (KR); Do Gyun Kim, Daejeon (KR); Sang Sok Jung, Daejeon (KR); Byoung Kook Lee, Daejeon (KR); Byoung Gu Lee, Daejeon (KR); Geon Woo Min, Daejeon (KR); Chan Bae Kim, Daejeon (KR)

(73) Assignee: LG Chem, Ltd.

( * ) Notice: Subject to any disclaimer, the term of this patent is extended or adjusted under 35 U.S.C. 154(b) by 54 days.

(21) Appl. No.: 16/489,602

(22) PCT Filed: Sep. 13, 2018

(86) PCT No.: PCT/KR2018/010740
§ 371 (c)(1),
(2) Date: Aug. 28, 2019

(87) PCT Pub. No.: WO2019/054765
PCT Pub. Date: Mar. 21, 2019

(65) Prior Publication Data
US 2019/0386272 A1  Dec. 19, 2019

(30) Foreign Application Priority Data
Sep. 13, 2017 (KR) .................. 10-2017-0117208

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0422* (2013.01); *H01M 10/0431* (2013.01);
(Continued)

(58) Field of Classification Search
CPC .. H01M 2/022; H01M 2/0434; H01M 2/0426; H01M 50/169; H01M 50/183;
(Continued)

(56) References Cited

U.S. PATENT DOCUMENTS 3,922,178 A * 11/1975 Winger ................... H01M 2/00
429/82
4,256,815 A * 3/1981 Smilanich ............... H01M 2/08
429/185
(Continued)

FOREIGN PATENT DOCUMENTS

EP 2482358 A1 8/2012
EP 2626925 A2 8/2013
(Continued)

OTHER PUBLICATIONS

International Search Report for Application No. PCT/KR2018/010740, dated Dec. 12, 2018, pp. 1-2.
(Continued)

*Primary Examiner* — Magali P Slawski
*Assistant Examiner* — Jessie L. Walls
(74) *Attorney, Agent, or Firm* — Lerner, David, Littenberg, Krumholz & Mentlik, LLP

(57) ABSTRACT

A cylindrical battery cell includes a jelly-roll type electrode assembly, configured to have a structure in which a positive electrode and a negative electrode are wound in a state in which a separator is disposed between the positive electrode and the negative electrode; a cylindrical battery case having no beading part; a cap assembly located at the open upper end of the cylindrical battery case, the cap assembly including a safety vent configured to rupture in order to exhaust gas when pressure in the battery case increases; a gasket mounted so as to surround the outer circumference of the safety vent in order to maintain insulation between the cap
(Continued)

assembly and the cylindrical battery case; and a washer for fixing the cap assembly to the cylindrical battery case, the washer coupled to an upper surface of an outer circumferential portion of the open upper end of the cylindrical battery case.

15 Claims, 2 Drawing Sheets

(51) Int. Cl.
| | |
|---|---|
| *H01M 50/10* | (2021.01) |
| *H01M 50/107* | (2021.01) |
| *H01M 50/147* | (2021.01) |
| *H01M 50/578* | (2021.01) |
| *H01M 50/183* | (2021.01) |
| *H01M 50/166* | (2021.01) |
| *H01M 50/169* | (2021.01) |

(52) U.S. Cl.
CPC ......... *H01M 50/10* (2021.01); *H01M 50/107* (2021.01); *H01M 50/147* (2021.01); *H01M 50/166* (2021.01); *H01M 50/169* (2021.01); *H01M 50/183* (2021.01); *H01M 50/578* (2021.01); *H01M 2200/20* (2013.01)

(58) Field of Classification Search
CPC .. H01M 50/166; H01M 50/10; H01M 50/107; H01M 50/147; H01M 10/0422; H01M 10/0431; H01M 2200/20
See application file for complete search history.

(56) References Cited

U.S. PATENT DOCUMENTS

| | | | |
|---|---|---|---|
| 6,461,757 B1 * | 10/2002 | Sasayama | H01M 2/06 429/59 |
| 9,178,190 B2 | 11/2015 | Kim et al. | |
| 2005/0048365 A1 | 3/2005 | Miyahisa et al. | |
| 2009/0117459 A1 * | 5/2009 | Hyung | H01M 10/425 429/185 |
| 2010/0015508 A1 | 1/2010 | Hwang | |
| 2012/0129010 A1 * | 5/2012 | Hong | H01M 2/1022 429/7 |
| 2013/0216870 A1 | 8/2013 | Kim et al. | |
| 2014/0302358 A1 * | 10/2014 | Kim | H01M 50/528 429/53 |
| 2015/0004446 A1 | 1/2015 | Kim et al. | |
| 2018/0123163 A1 * | 5/2018 | Park | H01M 50/183 |
| 2020/0144574 A1 * | 5/2020 | Bae | H01M 50/30 |

FOREIGN PATENT DOCUMENTS

| | | |
|---|---|---|
| EP | 2822060 A1 | 1/2015 |
| JP | H08180849 A | 7/1996 |
| JP | 2003051295 A | 2/2003 |
| JP | 2005100927 A | 4/2005 |
| JP | 2009117362 A | 5/2009 |
| JP | 2010511992 A | 4/2010 |
| JP | 2013502048 A | 1/2013 |
| JP | 2013542567 A | 11/2013 |
| JP | 2015534232 A | 11/2015 |
| KR | 20070080866 A | 8/2007 |
| KR | 20080058966 A | 6/2008 |
| KR | 20110105952 A | 9/2011 |
| KR | 20110105953 A | 9/2011 |
| KR | 20120047114 A | 5/2012 |
| KR | 20120052586 A | 5/2012 |
| KR | 20120102347 A | 9/2012 |
| KR | 20130074236 A | 7/2013 |
| KR | 20140106329 A | 9/2014 |
| KR | 20160088585 A | 7/2016 |
| KR | 20170063134 A | 6/2017 |
| WO | 2008069476 A1 | 6/2008 |

OTHER PUBLICATIONS

Extended European Search Report with Written Opinion for Application No. 18857031.1 dated Apr. 8, 2020, 11 pages.

* cited by examiner

【FIG. 1】
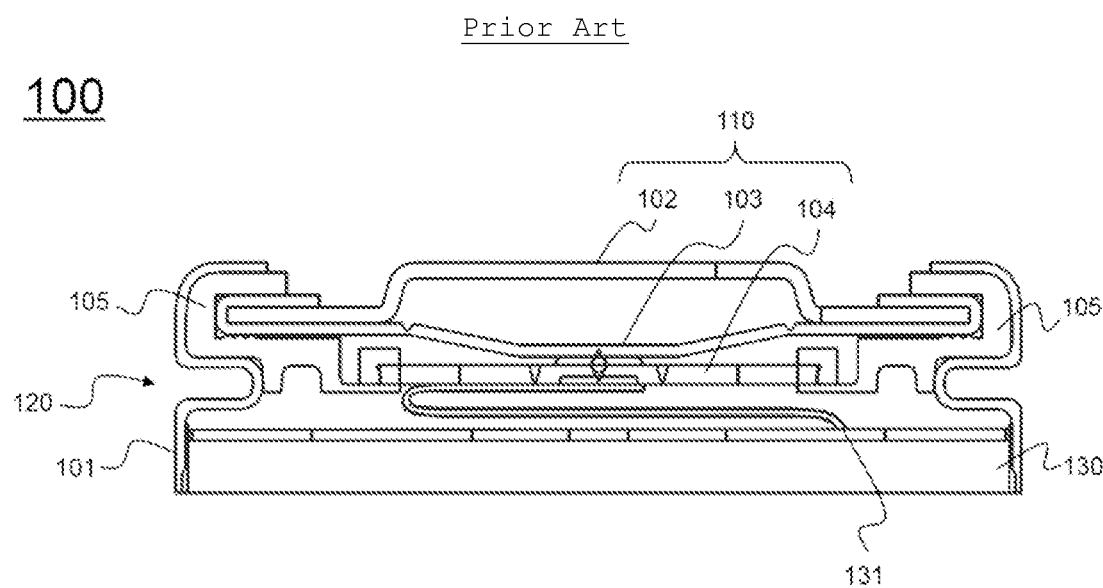
【FIG. 2】
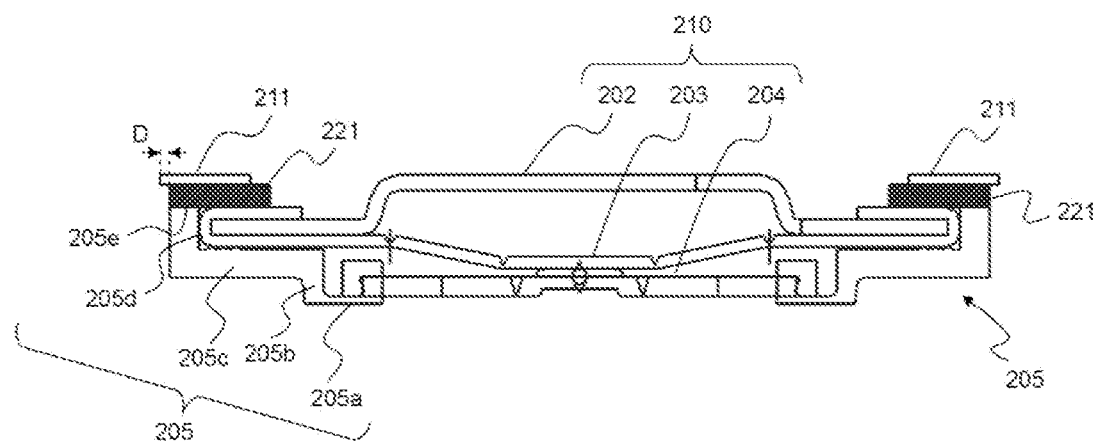

【FIG. 3】
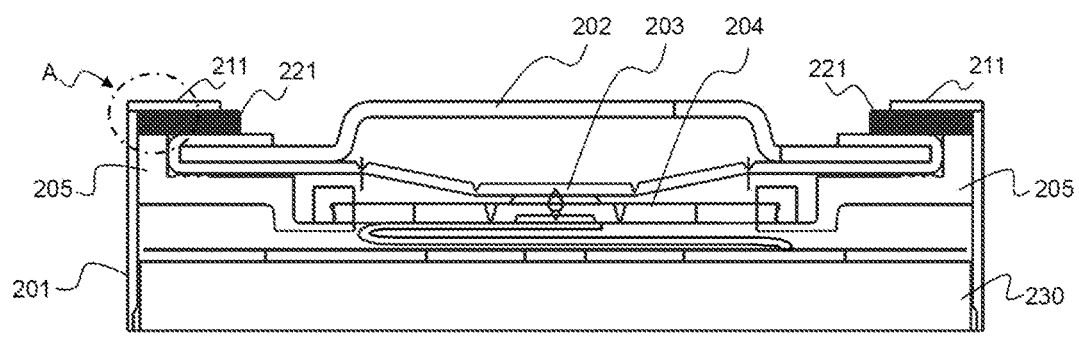
【FIG. 4】
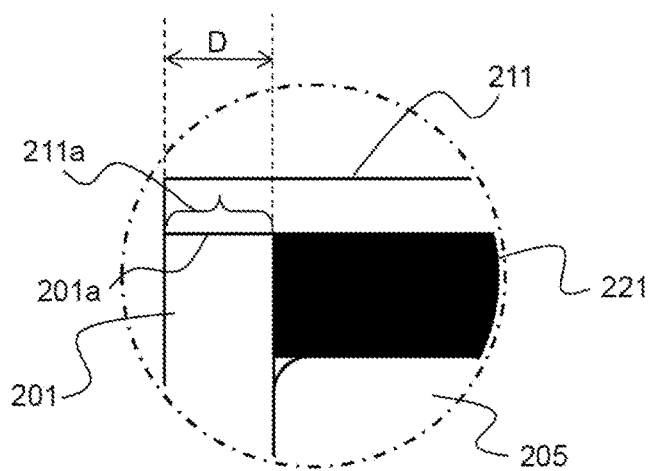

CYLINDRICAL BATTERY CELL HAVING NO BEADING PART

CROSS-REFERENCE TO RELATED APPLICATIONS

This application is a national phase entry under 35 U.S.C. § 371 of International Application No. PCT/KR2018/010740 filed Sep. 13, 2018, which claims priority from Korean Patent Application No. 10-2017-0117208 filed on Sep. 13, 2017, the disclosures of which are hereby incorporated by reference herein in their entirety.

TECHNICAL FIELD

The present invention relates to a cylindrical battery cell having no beading part, and more particularly to a cylindrical battery cell configured to have a structure in which a jelly-roll type electrode assembly is received in a cylindrical battery case having no beading part and in which a gasket, which surrounds the outer circumference of a safety vent and a portion of the lower surface of the safety vent, is coupled to a washer, which fixes a cap assembly, in order to maintain insulation between the cylindrical battery case and the cap assembly, whereby the capacity of the battery cell is increased in proportion to the size of the beading part, which is omitted.

BACKGROUND ART

Secondary batteries, which can be charged and discharged, have been widely used as energy sources for wireless mobile devices. In addition, secondary batteries have attracted considerable attention as energy sources for electric vehicles and hybrid electric vehicles, which have been developed to solve problems, such as air pollution, caused by existing gasoline and diesel vehicles using fossil fuels. Therefore, secondary batteries are being applied in an increasing number of applications owing to the advantages thereof, and, in the future, secondary batteries are expected to be applied to even more applications and products.

In general, based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet. The electrode assembly, which is mounted in the battery case, is a power generating element that includes a positive electrode, a negative electrode, and a separator that is interposed between the positive electrode and the negative electrode and that can be charged and discharged. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and the jelly-roll type electrode assembly has high energy density per unit weight.

FIG. 1 is a vertical sectional view schematically showing the upper part of a general cylindrical battery cell having a beading part.

Referring to FIG. 1, a cylindrical battery cell 100 is manufactured by placing a jelly-roll type electrode assembly 130 in a reception unit defined in a cylindrical can 101, injecting an electrolytic solution into the reception unit such that the electrode assembly 130 is fully impregnated with the electrolytic solution, and coupling a cap assembly 110 to the upper end, which is open, of the cylindrical can.

The cap assembly 110 is connected to a positive electrode tab 131, and is configured to have a structure in which a top cap 102 and a safety vent 103 for lowering internal pressure are disposed in a gasket 105 for maintaining airtightness, the gasket being mounted to the upper inner surfaces of a crimping part and a beading part 120 of the cylindrical can, in the state in which the top cap 102 and the safety vent 103 are in tight contact with each other. The middle portion of the top cap 102 protrudes upwards such that the top cap 102 functions as a positive electrode terminal when the top cap 102 is connected to an external circuit, and a plurality of through holes, through which gas in the cylindrical can is discharged out of the cylindrical can, are formed along the circumference of the protruding portion of the top cap 102.

In the case in which the beading part is formed at the cylindrical can, however, the height of the cylindrical can is reduced, whereby the capacity of the battery cell is reduced. Furthermore, in the case in which the height or diameter of the cylindrical can is changed at the time of performing a beading process, it is necessary to change beading conditions. As a result, productivity is reduced, and cost is increased.

In order to solve these problems, Korean Patent Application Publication No. 2016-00885858 discloses a cylindrical battery cell having no beading part. However, the disclosed cylindrical battery cell is configured to have a structure in which a cap assembly is inserted into a cylindrical can by interference fitting and the outer circumference of the cap assembly is welded to the cylindrical can. During assembly of the cap assembly, therefore, the cap assembly or the cylindrical can may be easily damaged.

Korean Patent Application Publication No. 2007-0080866 discloses a cylindrical battery cell having no beading part configured such that a protrusion or a support structure is formed on the inner surface of a cylindrical can in order to fix a cap assembly. However, this patent document does not disclose technology that is capable of increasing the capacity of the battery cell by changing the structure of a gasket for maintaining insulation between the cylindrical can and the cap assembly.

Therefore, there is an urgent necessity for technology that is capable of coupling a cap assembly to a cylindrical case without damage to the cap assembly while minimizing the size of a dead space defined in the cylindrical can, in which a jelly-roll type electrode assembly is received, in order to increase the capacity of the cylindrical battery cell.

DISCLOSURE

Technical Problem

The present invention has been made in view of the above problems and other technical problems that have yet to be resolved, and it is an object of the present invention to provide a cylindrical battery cell configured to have a structure in which a jelly-roll type electrode assembly is received in a cylindrical battery case having no beading part and in which a gasket for maintaining insulation between a cap assembly and the cylindrical battery case surrounds the outer circumference of a safety vent and a portion of the lower surface of the safety vent, and the gasket is coupled to a washer, which fixes the cap assembly, whereby the size of the cylindrical battery case, in which the jelly-roll type electrode assembly is received, is increased in proportion to the size of the beading part, which is omitted.

Consequently, it is possible to provide a cylindrical battery cell having a capacity increased in proportion to an increase in the size of an electrode assembly reception unit.

Technical Solution

In accordance with an aspect of the present invention, the above and other objects can be accomplished by the provision of a cylindrical battery cell including a jelly-roll type electrode assembly, configured to have a structure in which a positive electrode and a negative electrode are wound in the state in which a separator is disposed between the positive electrode and the negative electrode, a cylindrical battery case having no beading part, a cap assembly located at the open upper end of the cylindrical battery case, and a gasket mounted so as to surround the outer circumference of a safety vent and a portion of the lower surface of the safety vent in order to maintain insulation between the cap assembly and the cylindrical battery case, wherein the cap assembly includes the safety vent, which is configured to rupture in order to exhaust gas when the pressure in the battery case increases, a cap plate mounted on the safety vent, the cap plate having formed therein through holes for discharging gas, and a current interrupt member attached to the lower end of the safety vent for interrupting current when the pressure in the battery case increases, and wherein the gasket is located on an outer circumferential portion of the open upper surface of the battery case and is coupled to a washer for fixing the cap assembly.

In general, a cylindrical battery cell is configured such that a top cap, including a current interrupt device (CID), for interrupting current and reducing the magnitude of the pressure in the battery cell when the battery cell operates abnormally, and a positive temperature coefficient (PTC) element, for interrupting current by increasing battery cell resistance when the temperature in the battery cell increases, is coupled to the open upper end of a cylindrical can in order to guarantee the safety of the cylindrical battery cell.

In order to couple the top cap to the cylindrical can, the upper end portion of the cylindrical can is recessed inwards by a predetermined width, the top cap is loaded on the upper end of the cylindrical can, and the upper end portion of the cylindrical can is bent to form a beading part such that the outer circumference of the top cap is surrounded by the beading part. The coupling of the top cap using the beading part is achieved based on the plastic deformation and high mechanical strength of metal, from which the cylindrical can is made, whereby the coupling of the top cap is stably maintained.

However, the space in the battery case is reduced due to the formation of the beading part, whereby the capacity of the battery cell is reduced.

In the case in which the washer, which is located on the open upper surface of the cylindrical battery case, is coupled to the cap assembly, as in the present invention, the cap assembly is fixed in the state in which the washer is attached, whereby the beading part for fixing the cap assembly may be omitted from the battery case.

Since a battery case having no beading part is used, as described above, it is possible to omit the process of forming the beading part, whereby it is possible to omit the process of adjusting the size of the battery cell in order to form the beading part and thus to reduce cost.

In addition, since the process of forming the beading part is omitted, it is not necessary to use a gasket configured to have a structure that surrounds a portion of the upper surface of the cap plate. The gasket used in the present invention may be configured to have a structure that surrounds the outer circumference of the cap plate or the outer circumference of the safety vent and a portion of the lower surface of the safety vent.

In addition, it is possible to increase the height of the jelly-roll type electrode assembly in proportion to the height of the beading part, which is omitted, and therefore it is possible to provide a cylindrical battery cell having a capacity increased in proportion to the increased volume of the electrode assembly.

In a concrete example, the gasket may be coupled to the washer via a thermoplastic adhesive layer. The thermoplastic adhesive layer is attached to the lower surface of the washer, the gasket is located under the thermoplastic adhesive layer, and the thermoplastic adhesive layer is heated so as to melt, whereby the gasket and the washer may be coupled to each other.

The thermoplastic adhesive layer is not particularly restricted, as long as the thermoplastic adhesive layer provides high adhesive force without melting at temperatures at which the battery cell is normally used. For example, the thermoplastic adhesive layer may be at least one selected from a group consisting of polyurethane (PU), polyethylene (PE), polypropylene (PP), polyvinyl alcohol (PVA), silicon-based resin, epoxy-based resin, polyester, isocyanate-based resin, and engineering plastic, and the engineering plastic may be polyether ether ketone (PEEK), polyketone (PK), fluoropolymer (FP), liquid crystal polymer (LCP), polyvinylidene fluoride (PVDF), polyphenylene sulfide (PPS), polyphthalamide (PPA), polyamide (PA), polycyclohexylene dimethylene terephthalate (PCT), polybutylene terephthalate (PBT), polyethylene terephthalate (PET), polyoxymethylene (POM), modified polypropylene (PP-modified), ultra high molecular weight polyethylene (PE-UHMW), high-density polyethylene (PE-HD), or low-density polyethylene (PE-LD).

The cylindrical battery cell according to the present invention does not include a structure for fixing the cap assembly in the cylindrical battery case. The cap assembly may be received in the battery case in the state of being coupled to the washer together with the gasket.

Since the washer is located on the outer circumferential portion of the open upper surface of the cylindrical battery case in the state of being coupled to the cap assembly, the size of the washer must be set such that the washer cannot move toward the inside of the battery case in the state in which the washer is fixed in position. In the case in which the outer diameter of the washer is larger than the outer diameter of the battery case, however, the size of the upper end of the battery case is unnecessarily increased. Preferably, therefore, the outer diameter of the washer is equal to the outer diameter of the battery case.

For example, the outer diameter of the cap assembly may be smaller than the outer diameter of the washer, and the cap assembly and the washer may be coupled to each other such that the center of the cap assembly is aligned with the center of the washer. The outer circumference of the washer may extend further outwards than the outer circumference of the cap assembly.

Consequently, the outer circumference of the lower surface of the washer, which extends further outwards than the outer circumference of the cap assembly, may be coupled to the upper surface of the outer circumferential portion of the battery case by welding in the state of being located so as to be placed on the upper surface of the outer circumferential portion of the battery case.

In order to increase the force of welding between the battery case and the washer, as described above, the washer may be made of the same material as the battery case.

The gasket may be configured to have a structure including a first coupling part, coupled to an outer circumferential portion of the lower surface of the current interrupt member, a step part, bent upwards perpendicularly from the outer circumference of the first coupling part, a second coupling part, bent outwards from the upper part of the step part so as to be parallel to the first coupling part and coupled to the lower surface of the safety vent, a third coupling part, bent upwards perpendicularly from the outer circumference of the second coupling part and coupled to an outer circumference of the safety vent and to an outer circumference of the cap plate, and a fourth coupling part, coupled to the washer so as to serve as the upper outer circumference of the third coupling part.

Consequently, the gasket may be configured to have a structure that surrounds the outer circumference of the safety vent and the outer circumference of the cap plate while supporting a portion of the lower surface of the current interrupt member, located under the cap plate. Alternatively, in the case in which the safety vent is configured to have a structure that surrounds the outer circumference of the cap plate, the gasket may be configured to have a structure that surrounds the outer circumference of the safety vent while supporting a portion of the lower surface of the current interrupt member.

The washer is coupled to the gasket and to the cap assembly. In order to achieve coupling between the washer and the cap assembly, the washer may have an inner diameter sufficient to cover a portion of the outer circumference of the cap plate.

Specifically, the gasket and the cap plate may be fixed to the washer in which the washer is coupled to the fourth coupling part of the gasket and to a portion of the cap plate.

In a concrete example, the distance between the electrode assembly and the lower end of the cap assembly may be smaller than the height of the step part.

The cylindrical battery cell according to the present invention uses a cylindrical battery case having no beading part. Compared to the case in which the beading part is provided, therefore, the length of the electrode tab coupled to the current interrupt member is reduced, and the height of the electrode assembly is increased in proportion to the height of the beading part, which is omitted. Consequently, the distance between the electrode assembly and the lower end of the cap assembly becomes relatively short.

In accordance with another aspect of the present invention, there is provided a battery pack including the cylindrical battery cell.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a vertical sectional view showing the upper part of a conventional cylindrical battery cell having a beading part.

FIG. 2 is a vertical sectional view showing a cap assembly according to an embodiment of the present invention.

FIG. 3 is a vertical sectional view showing the upper part of a cylindrical battery cell, in which the cap assembly of FIG. 2 is received.

FIG. 4 is an enlarged view showing part A of FIG. 3.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 2 is a vertical sectional view showing a cap assembly according to an embodiment of the present invention.

Referring to FIG. 2, the cap assembly, denoted by reference numeral 210, includes a safety vent 203 configured to rupture in order to exhaust gas when the pressure in a battery case increases, a cap plate 202 mounted on the safety vent 203, and a current interrupt member 204 attached to the lower end of the safety vent 203 for interrupting current when the pressure in the battery case increases.

A gasket 205, which is configured to have a structure that surrounds the outer circumference of the cap assembly 210 and a portion of the lower surface of the cap assembly 210, is coupled to a washer 211 via a thermoplastic adhesive layer 221. The thermoplastic adhesive layer 221 is attached so as to extend from a location that is spaced apart inwards from the outer circumference of the washer 211 by a predetermined distance D. The outer diameter of the washer 211 is larger than the outer diameter of the gasket 205, and the washer 211 is coupled to the gasket 205 such that the center of the washer 211 is aligned with the center of the gasket 205.

The gasket 205 is configured to have a structure including a first coupling part 205a, coupled to an outer circumferential portion of the lower surface of the current interrupt member 204, a step part 205b, bent upwards perpendicularly from the outer circumference of the first coupling part 205a, a second coupling part 205c, bent outwards from the upper part of the step part 205b so as to be parallel to the first coupling part and coupled to the lower surface of the safety vent 203, a third coupling part 205d, bent upwards perpendicularly from the outer circumference of the second coupling part 205c and coupled to the outer circumference of the cap plate 202, which is surrounded by the outer circumference of the safety vent 203, and a fourth coupling part 205e, coupled to the washer 211 so as to serve as the upper outer circumference of the third coupling part 205d.

Alternatively, in the case in which the safety vent is not configured to have a structure that surrounds the outer circumference of the cap plate, the third coupling part 205d may be located so as to be coupled to the outer circumference of the safety vent and to the outer circumference of the cap plate.

FIG. 3 is a partial vertical sectional view schematically showing the state in which the cap assembly of FIG. 2 is received in a cylindrical battery case, and FIG. 4 is an enlarged view showing part A of FIG. 3.

Referring to FIGS. 3 and 4, the washer 211 is located on an outer circumferential portion of the open upper end of the cylindrical battery case 201 in the state of being coupled to the fourth coupling part of the gasket 205 and to a portion of the safety vent 203, which is configured to have a structure that surrounds the cap plate 202, via the thermoplastic adhesive layer 221.

Alternatively, in the case in which the safety vent 203 is not configured to have a structure that surrounds the cap plate 202, unlike FIG. 3, the washer 211 is located on the outer circumferential portion of the open upper end of the cylindrical battery case 201 in the state of being coupled to the fourth coupling part of the gasket 205 and to a portion of the cap plate 202, via the thermoplastic adhesive layer 221.

The outer diameter of the washer 211 is equal to the outer diameter of the battery case 201, and the outer circumferential portion 211a of the lower surface of the washer 211, to which the thermoplastic adhesive layer 221 is not attached, is coupled to the upper surface 201a of the outer circumferential portion of the upper end of the battery case 201 by welding.

The battery case 201 has no beading part 120, unlike the battery case 101. Consequently, it is possible to increase the size of the electrode assembly 230 compared to the case in which the beading part is provided. As a result, the distance between the electrode assembly and the current interrupt member, which is located at the lower end of the cap assembly, is reduced so as to be smaller than the height of the step part of the gasket 205.

As is apparent from the above description, the cylindrical battery cell according to the present invention uses a battery case having no beading part and is configured to have a structure in which the cap assembly and the gasket are coupled to the washer via the thermoplastic adhesive layer in order to fix the cap assembly to the battery case. Consequently, it is possible to increase the size of the electrode assembly in proportion to the height of the beading part, which is omitted, whereby it is possible to provide a high-capacity cylindrical battery cell.

Those skilled in the art to which the present invention pertains will appreciate that various applications and modifications are possible based on the above description without departing from the scope of the present invention.

DESCRIPTION OF REFERENCE NUMERALS 100, 200: Cylindrical battery cells
101, 201: Cylindrical battery cases
102: Top cap
202: Cap plate
103, 203: Safety vents
104, 204: Current interrupt members
105, 205: Gaskets
205a: First coupling part of gasket
205b: Step part of gasket
205c: Second coupling part of gasket
205d: Third coupling part of gasket
205e: Fourth coupling part of gasket
110, 210: Cap assemblies
130, 230: Electrode assemblies
131: Positive electrode tab
201a: Upper surface of outer circumferential portion of upper end of battery case
211: Washer
211a: Outer circumferential portion of lower surface of washer
221: Thermoplastic adhesive layer
D: Distance between outer circumference of washer and outer circumference of thermoplastic adhesive layer

INDUSTRIAL APPLICABILITY

As is apparent from the above description, the cylindrical battery cell according to the present invention uses a cylindrical battery case having no beading part and a gasket configured to have a structure that does not surround the upper surface of a cap plate. Consequently, it is possible to increase the size of the cylindrical battery case, in which an electrode assembly is mounted, whereby it is possible to provide a high-capacity cylindrical battery cell.

In addition, no process of forming the beading part is required, whereby it is possible to prevent a decrease in productivity and an increase in cost due to the production of the beading part.

The invention claimed is:
1. A cylindrical battery cell comprising:
a jelly-roll type electrode assembly, configured to have a structure in which a positive electrode and a negative electrode are wound in a state in which a separator is disposed between the positive electrode and the negative electrode;
a cylindrical battery case having no beading part;
a cap assembly located at an open upper end of the cylindrical battery case, the cap assembly including a safety vent configured to rupture in order to exhaust gas when pressure in the battery case increases;
a gasket mounted so as to surround an outer circumference of the safety vent in order to maintain insulation between the cap assembly and the cylindrical battery case, the gasket including an upwardly extending portion having a longitudinal dimension extending upwardly towards the open upper end of the cylindrical battery case and to an upper edge, the gasket terminating at the upper edge of the upwardly extending portion; and a washer for fixing the cap assembly to the cylindrical battery case, the washer having a lower surface coupled to an upper surface of an outer circumferential portion of the open upper end of the cylindrical battery case, the lower surface of the washer defining a plane extending transverse to the longitudinal dimension of the upwardly extending portion of the gasket, and the lower surface of the washer being coupled to the upper edge of the upwardly extending portion of the gasket via an adhesive layer disposed therebetween.

2. The cylindrical battery cell according to claim 1, wherein the adhesive layer is a thermoplastic adhesive layer.

3. The cylindrical battery cell according to claim 2, wherein
the thermoplastic adhesive layer is at least one selected from a group consisting of polyurethane (PU), polyethylene (PE), polypropylene (PP), polyvinyl alcohol (PVA), silicon-based resin, epoxy-based resin, polyester, isocyanate-based resin, and engineering plastic,
the engineering plastic being selected from a group consisting of polyether ether ketone (PEEK), polyketone (PK), fluoropolymer (FP), liquid crystal polymer (LCP), polyvinylidene fluoride (PVDF), polyphenylene sulfide (PPS), polyphthalamide (PPA), polyamide (PA), polycyclohexylene dimethylene terephthalate (PCT), polybutylene terephthalate (PBT), polyethylene terephthalate (PET), polyoxymethylene (POM), modified polypropylene (PP-modified), ultra high molecular weight polyethylene (PE-UHMW), high-density polyethylene (PE-HD), and low-density polyethylene (PE-LD).

4. The cylindrical battery cell according to claim 1, wherein the cap assembly is received in the battery case in a state of being coupled to the washer together with the gasket.

5. The cylindrical battery cell according to claim 1, wherein the washer has an outer diameter equal to an outer diameter of the battery case.

6. The cylindrical battery cell according to claim 1, wherein an outer circumferential portion of the lower surface of the washer is coupled to the upper surface of the outer circumferential portion of the open upper end of the battery case by welding.

7. The cylindrical battery cell according to claim 1, wherein the washer is made of a same material as the battery case.

8. A battery pack comprising the cylindrical battery cell according to claim 1.

9. The cylindrical battery cell according to claim 1, wherein the cap assembly includes:
a cap plate mounted on the safety vent, the cap plate having formed therein through holes for discharging gas; and
a current interrupt member attached to a lower end of the safety vent for interrupting current when the pressure in the battery case increases.

10. The cylindrical battery cell according to claim 6, wherein the gasket is configured to have a structure comprising:
a first coupling part, coupled to an outer circumferential portion of a lower surface of the current interrupt member;
a step part, bent upwards perpendicularly from an outer circumference of the first coupling part;
a second coupling part, bent outwards from an upper part of the step part so as to be parallel to the first coupling part and coupled to a lower surface of the safety vent;
a third coupling part, bent upwards perpendicularly from an outer circumference of the second coupling part and coupled to an outer circumference of the safety vent and to an outer circumference of the cap plate, the third coupling part corresponding to the upwardly extending portion of the gasket; and
a fourth coupling part, coupled to the washer so as to serve as an upper outer circumference of the third coupling part, the fourth coupling part corresponding to the upper edge of the gasket.

11. The cylindrical battery cell according to claim 10, wherein the washer is coupled to the fourth coupling part of the gasket and to a portion of the cap plate.

12. The cylindrical battery cell according to claim 10, wherein a distance between the electrode assembly and a lower end of the cap assembly is smaller than a height of the step part.

13. The cylindrical battery cell according to claim 9, wherein the washer has an inner diameter sufficient to cover a portion of an outer circumference of the cap plate.

14. The cylindrical battery cell according to claim 1, wherein the gasket is mounted so as to surround a portion of a lower surface of the safety vent.

15. The cylindrical battery cell according to claim 1, wherein the adhesive layer extends inwardly along the plane of the lower surface of the washer towards a central axis of the cylindrical battery.

* * * * *